(12) United States Patent
Houbre

(10) Patent No.: US 6,842,322 B2
(45) Date of Patent: Jan. 11, 2005

(54) ELECTRONIC TRIP DEVICE COMPRISING A CAPACITOR FOR SUPPLY OF A TRIP COIL

(75) Inventor: Pascal Houbre, Jarrie (FR)

(73) Assignee: Schneider Electric Industries SAS (FR)

(*) Notice: Subject to any disclaimer, the term of this patent is extended or adjusted under 35 U.S.C. 154(b) by 246 days.

(21) Appl. No.: 10/131,198

(22) Filed: Apr. 25, 2002

(65) Prior Publication Data
US 2002/0191361 A1 Dec. 19, 2002

(30) Foreign Application Priority Data
Jun. 19, 2001 (FR) .............................. 01 08021

(51) Int. Cl.⁷ .......................... H02H 7/10; H01H 73/00
(52) U.S. Cl. .............................. 361/115; 361/96; 361/87
(58) Field of Search .............................. 361/54, 56, 23, 361/28, 29, 31, 78, 87, 89, 93, 94, 97, 115; 363/50–58

(56) References Cited

U.S. PATENT DOCUMENTS
4,567,540 A    1/1986  Ruta ............................. 381/93

FOREIGN PATENT DOCUMENTS
DE    32 23 687 A1    1/1984

Primary Examiner—Jonathan Salata
(74) Attorney, Agent, or Firm—Parkhurst & Wendel, L.L.P.

(57) ABSTRACT

The trip device comprises a system-powered power supply circuit comprising a capacitor for power supply of a trip coil. When the trip device is powered on, the capacitor charges and its voltage is regulated according to a first reference voltage sufficient to activate the trip coil if necessary. After a preset period, regulation of the voltage at the terminals of the capacitor is performed according to a second reference voltage, lower than the first voltage. The reference voltage reverts to the first value during the same preset period when the measured current reaches a preset threshold, which constitutes an indication of the presence of a fault that will lead to tripping being required. The capacitor is therefore generally charged at a lower voltage than that which is necessary for tripping, thus enabling its size to be reduced.

5 Claims, 4 Drawing Sheets

ELECTRONIC TRIP DEVICE COMPRISING A CAPACITOR FOR SUPPLY OF A TRIP COIL

BACKGROUND OF THE INVENTION

The invention relates to an electronic trip device comprising current measuring means connected to an electronic processing circuit designed to perform protection functions and comparing the measured current with at least one tripping threshold, and to a power supply circuit comprising a power supply capacitor and means for regulating the voltage at the terminals of the capacitor according to a preset reference voltage.

STATE OF THE ART

In known trip devices, the trip coil is generally supplied by a supply capacitor of a power supply circuit. In system-powered trip devices, the supply capacitor is charged by current sensors associated to the conductors of an electrical power system to be protected. The power supply circuit is generally of the switching power supply type enabling the voltage at the terminals of the supply capacitor to be regulated.

In present trip devices, a first supply voltage of about 18V is generally required at the terminals of the supply capacitor to achieve dependable tripping by the trip coil. A second, lower, supply voltage, of about 10V for example, sufficient for supply of the electronic circuitry of the trip device, is branched off from the voltage at the terminals of the tripping capacitor.

As the lifetime of a capacitor is determined by the difference between the maximum voltage acceptable by the capacitor (rated voltage of the capacitor) and the actual operating voltage, the dependability of the tripping capacitor implies the use of capacitors of sufficient size.

OBJECT OF THE INVENTION

The object of the invention is to provide a trip device enabling the dependability of the tripping capacitor to be maintained or increased while at the same time reducing the size and cost thereof.

According to the invention, this object is achieved by the fact that the electronic processing circuit comprises means for comparing the measured current with a preset threshold, lower than the tripping threshold, the trip device comprising means for setting the reference voltage of the regulating means to a first preset value during a preset period, when power-on of the trip device is performed or when the measured current is equal to or greater than the preset threshold, and to a second preset value, lower than the first value, after said preset period.

According to a development of the invention, the second reference voltage value is lower than the voltage necessary to activate a trip coil of the trip device.

BRIEF DESCRIPTION OF THE DRAWINGS

Other advantages and features will become more clearly apparent from the following description of a particular embodiment of the invention given as a non-restrictive example only and represented in the accompanying drawings in which.

DESCRIPTION OF A PARTICULAR EMBODIMENT

Figure 1:
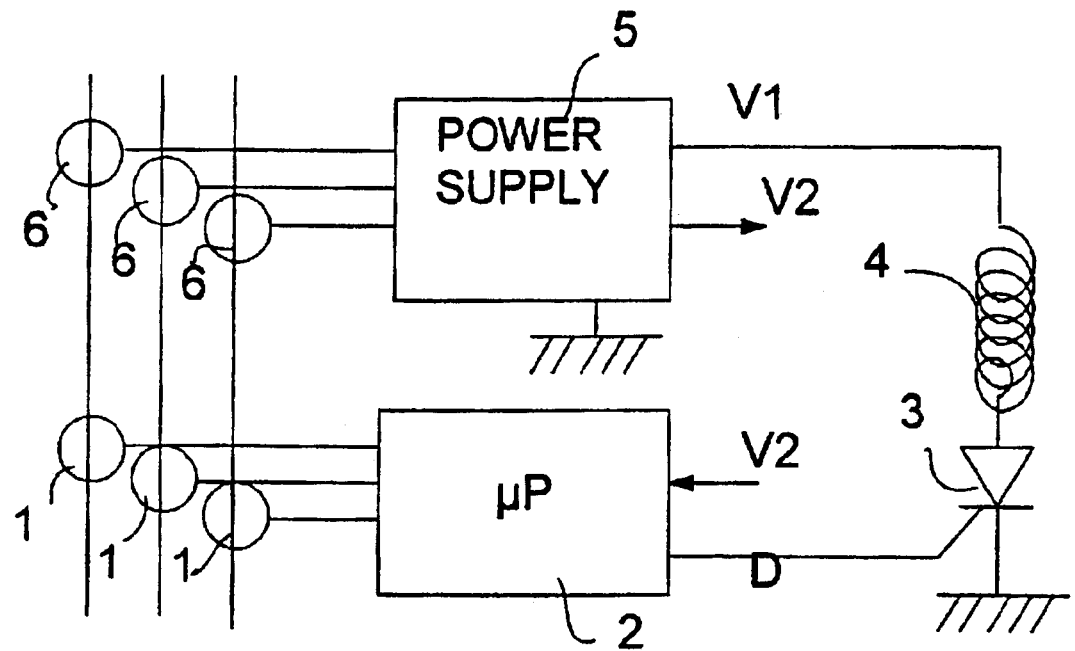
FIG. 1 represents an electronic trip device according to the prior art in schematic form.

An electronic trip device according to the prior art is illustrated in FIG. 1. Only the elements necessary for understanding the invention have been represented in the figure. Current sensors 1 associated to conductors of an electrical power system to be protected supply signals representative of the currents flowing in the conductors to an electronic processing circuit 2. The electronic processing circuit 2, preferably microprocessor-based and designed to perform protection functions, compares the measured currents with at least one tripping threshold and supplies a tripping signal D in the event of a fault, for example in case of an overload or short-circuit. The tripping signal D is applied to a control electrode of an electronic switch 3, for example formed by a thyristor. Closing of the electronic switch 3 by a tripping signal D causes excitation of a trip coil 4 connected in series with the electronic switch to the terminals of a first supply voltage $V_1$.

The first supply voltage $V_1$ is supplied by a power supply circuit 5. In system-powered trip devices, the power supply circuit 5 is supplied by current sensors associated to the conductors of the electrical power system to be protected. The current sensors connected to the power supply circuit can be the current sensors 1 or, as represented in FIG. 1, current sensors 6 distinct from the previous ones. In the latter case, the current sensors 1 are preferably air sensors, for example formed by Rogowski coils, whereas the current sensors 6 are preferably iron-core sensors.

The power supply circuit 5 also supplies a second supply voltage $V_2$, lower than the first, sufficient for power supply of the electronic circuitry of the trip device.

Figure 2:
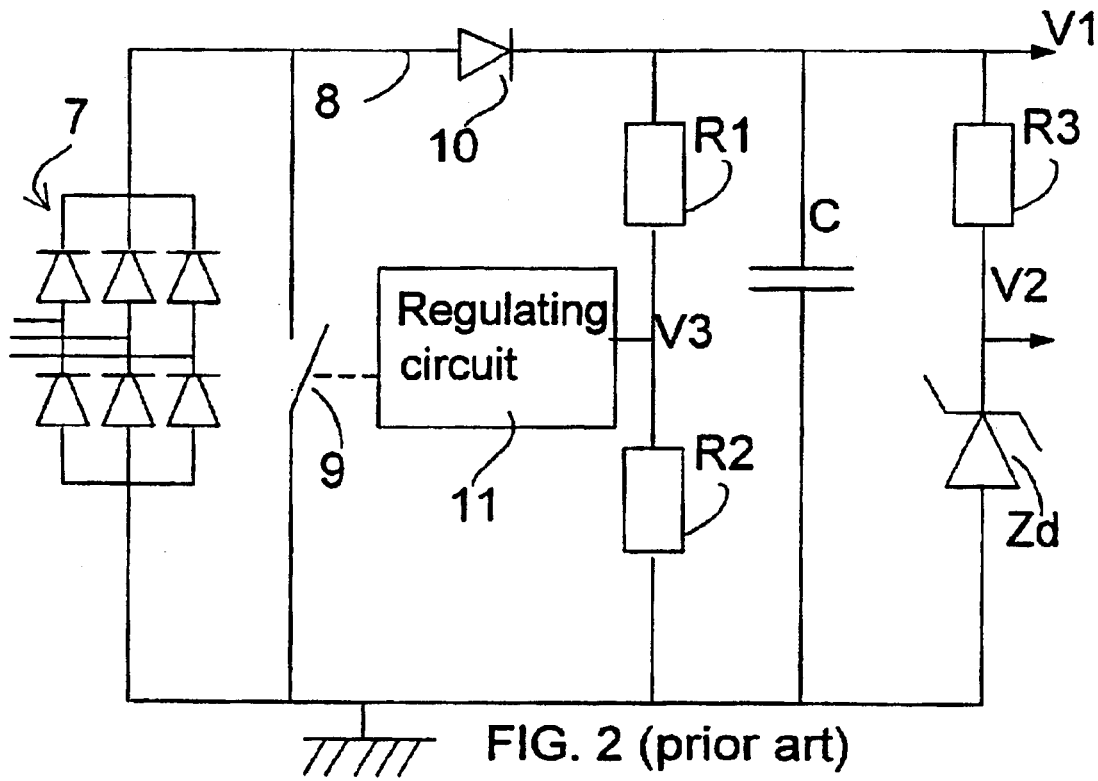
FIG. 2 represents a power supply circuit of a trip device according to the prior art.

Conventionally the power supply circuit 5 is of the switching power supply type enabling the voltage at the terminals of the supply capacitor to be regulated. In the particular embodiment represented in FIG. 2, the current sensors, 1 or 6, are connected to a rectifier circuit 7, preferably of the full-wave rectifier type, comprising two output terminals, one whereof is grounded and the other is connected to a conductor 8. An electronic switch 9, performing the function of a chopper, is connected in parallel to the output terminals of the rectifier circuit. A first output terminal of the power supply circuit 5 supplying the first supply voltage $V_1$ is connected to the conductor 8 via a diode 10 connected in such a way as to be on when the voltage at the output of the rectifying circuit 7 is greater than $V_1$ and off in the opposite case. A capacitor C is connected in parallel with a voltage divider between the first output terminal of the power supply circuit 5 and the ground. The voltage divider is a resistive divider formed by first and second resistors $R_1$ and $R_2$ connected in series. The mid-point of the resistive divider is connected to an input of a regulating circuit 11 which controls the electronic switch 9. A third resistor $R_3$ is connected in series with a Zener diode Zd in parallel to the capacitor C, the point common to the third resistor $R_3$ and the Zener diode Zd constituting a second output of the power supply circuit 5 supplying the second supply voltage $V_2$.

The voltage $V_3$ at the mid-point of the resistive divider is representative of the voltage $V_1$ at the terminals of the capacitor. So long as the voltage $V_3$ is lower than a preset reference voltage, the regulating circuit 11 keeps the electronic switch 9 in the open position (off in the case of a transistor). The conductor C therefore charges, via the rectifier circuit 7 and diode 10, from the current transformers. As soon as the voltage $V_3$ reaches the reference voltage, the regulating circuit 11 closes the electronic switch 9 (turn-on in the case of a transistor), thus short-circuiting the output of the rectifier circuit. The diode 10 is then turned off preventing charging of the capacitor C from continuing. The first supply voltage $V_1$ is thus regulated to the value of the preset reference voltage. The second supply voltage $V_2$ is then obtained at the terminals of the Zener diode Zd.

In known trip devices, the reference voltage is chosen so as to ensure dependable tripping of the trip coil at all times in the event of a fault. For example, if the voltage required for dependable tripping of the trip coil 4 is about 18V, the reference voltage is fixed at a value of 19V.

Figure 3:
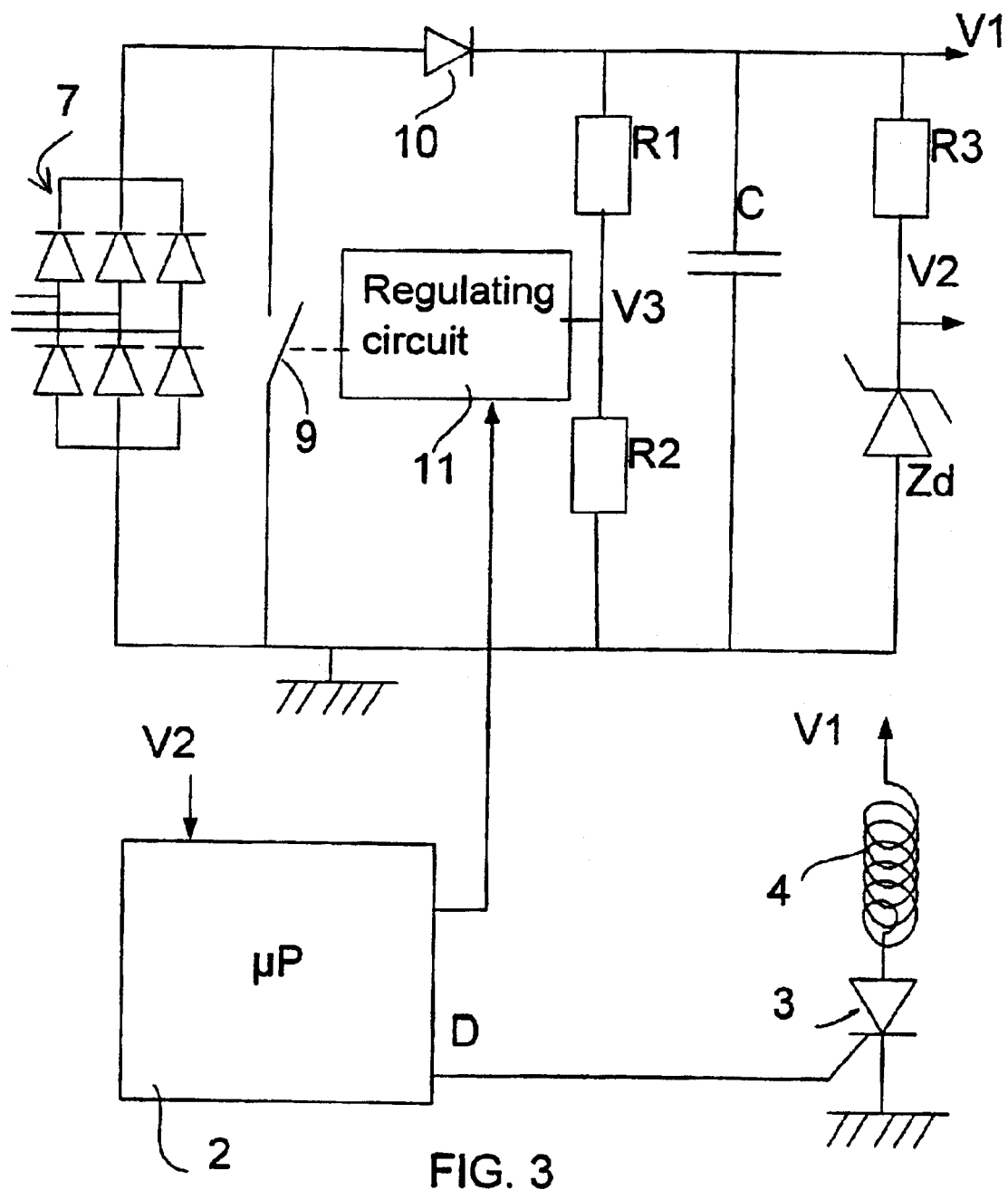
FIG. 3 represents a particular embodiment of a trip device according to the invention.

The trip device according to the invention represented in FIG. 3 differs from the one described above by the fact that the regulating circuit 11 comprises an additional input connected to an additional output of the electronic processing circuit 2 of the trip device. The electronic processing circuit 2 causes a modification of the reference voltage of the regulating circuit 11 so that it takes a first preset value during a preset period, when power-on of the trip device is performed or when the measured current I is equal to or greater than a preset threshold Is, lower than the tripping threshold, and a second preset value, lower than the first value, after said preset period.

Figure 4A:
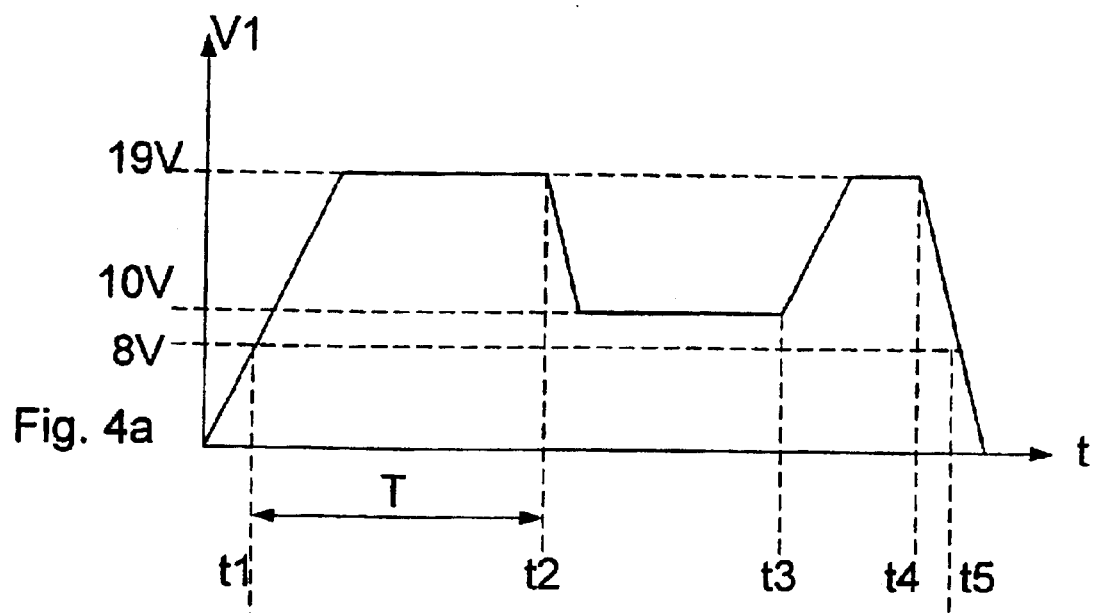
FIGS. 4a and 4b respectively illustrate the variations versus time of the voltage at the terminals of the supply capacitor and of a power supply signal of the electronic circuitry of a trip device according to FIG. 3.
Figure 4B:
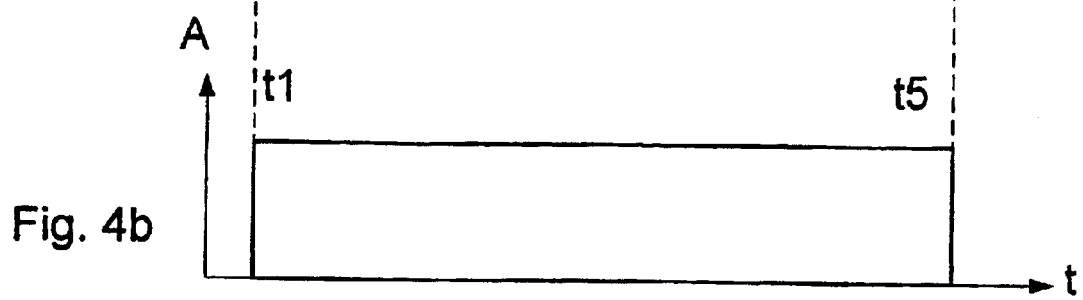

The operation of a trip device according to the invention will be explained in greater detail with reference to FIGS. 4a, 4b and 5.

On start-up, i.e. when power-on of the trip device is performed, the voltage $V_1$ at the terminals of the capacitor C is zero. As the electronic switch 9 is open, the capacitor starts charging. The voltage $V_1$ increases. At a time $t_1$, it reaches a sufficient value, for example 8V in FIG. 4A, to supply the electronic circuitry of the trip device and more particularly the electronic processing circuit 2. A power supply signal A (FIG. 4b), up to now at 0, then takes the value 1, initialising a start-up phase F1 (FIG. 5) of the electronic processing circuit microprocessor. This circuit then sets a quantity $\Delta t$ to zero in a phase F2, then sets the value of the reference voltage Vref to a first value in a phase F3. In the particular embodiment represented, this first value of the reference voltage is 19V. Under the control of the electronic processing circuit 2, the regulating circuit 11 uses this first value of the reference voltage during a preset period T, for example comprised between 10 milliseconds and 100 milliseconds.

Then, in a step F4, the microprocessor checks whether the period T has elapsed ($\Delta t=1$ s?). If this is the case (Yes output of F4), it then modifies the value of the reference voltage Vref in a step F5, which voltage takes a second value lower than the first one. In the particular embodiment represented, this second value of the reference voltage is 10V. Under the control of the electronic processing circuit 2, the regulating circuit 11 uses this second value of the reference voltage from a time $t_2$ ($t_2=t_1+T$). The capacitor C then discharges until the voltage at its terminals takes the second reference value. This value is chosen so as to be sufficient to provide a dependable power supply to the electronic circuitry of the trip device, i.e. it must be greater than 8V in the particular embodiment represented while being lower than the voltage necessary to ensure dependable activation of the trip coil. If the period T has not elapsed (No output of F4), the microprocessor goes on to a step F6 in which it increments the quantity $\Delta t$ ($\Delta t=\Delta t+1$) before looping back to the step F4.

After the step F5 where the reference voltage has dropped to the second, lower, value, the microprocessor monitors (step F7) a possible overshoot of a preset threshold Is, lower than the tripping threshold, by the measured current I ($I \geq Is?$). So long as the measured current remains lower than this threshold (No output of F7), the reference voltage remains unchanged and the microprocessor continues its monitoring of the evolution of the current by looping back to the step F7.

If at a time $t_3$ the measured current reaches or exceeds the threshold Is (Yes output of F7), the microprocessor loops back to the step F2. The reference voltage Vref then reverts to the first, higher, value and the capacitor C recharges until it reaches this value. Overshooting of the threshold Is by the current indicates that the latter has exceeded its normal value and constitutes an indication of the possibility of imminence of detection of a fault that will lead to tripping being required. As an example, if In is the rated current of the trip device, the threshold Is can be equal to 2 In. If the electronic processing circuit 2 does not detect a fault during the period T following the time $t_3$, the reference voltage reverts to its second value after this period. If on the other hand a fault is detected during this period, a tripping signal D is then transmitted at the time $t_4$ in FIG. 4b. The trip coil 4, correctly supplied by the capacitor C which has just been recharged, then performs interruption of the current in the power system to be protected. The power supply circuit 5 is then no longer supplied by the current sensors and the capacitor C discharges. At a time $t_5$, the voltage at the terminals of the capacitor becomes insufficient to supply the electronic circuitry of the trip device correctly (A=0). In conventional manner, the microprocessor takes measures to store certain data during the period $t_4$–$t_5$ following tripping.

Figure 5:
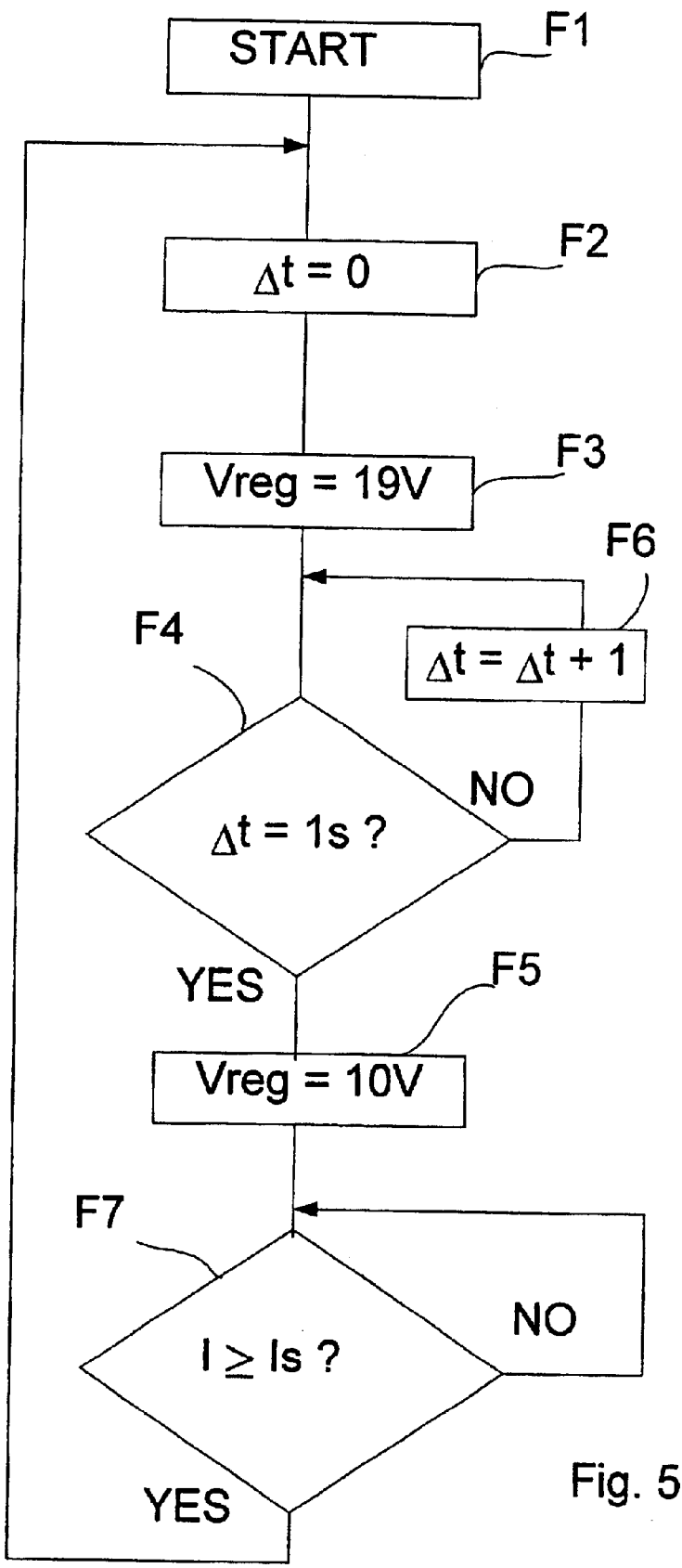
FIG. 5 represents a particular embodiment of a flowchart of operation of a power supply circuit of a trip device according to FIG. 3.

In the embodiment of FIG. 5, the specific values (19V and 10V) of the reference voltage are fixed during the steps F3 and F5, these values then being transmitted to the regulating circuit 11. In an alternative embodiment, the two values able to be taken by the reference voltage Vref are preset within the regulating circuit and the microprocessor only transmits to the regulating circuit a binary signal representative of the value to be used.

The invention thus enables the size and therefore the cost of the supply capacitor C of the trip coil 4 to be reduced whilst ensuring dependable operation of the latter in the event of a fault. As a trip is a relatively rare event, the capacitor is only at full charge during short periods, of 1s for example, during which a fault is liable to occur, viz. when power-on of the trip device is performed and when the measured current reaches a preset threshold Is.

As an example, a 22 µF capacitor with a maximum voltage of 35V can be replaced by a 22 µF capacitor with a maximum voltage of 25V. As the difference between the maximum voltage of the capacitor and the operating voltage is reduced from 35V–19V, i.e. 16V, to 25V–10V, i.e. 15V, the lifetime and dependability of the capacitor are appreciably maintained in spite of an appreciable reduction of the size and cost thereof. Inversely, at constant capacitor size, a large increase of the lifetime and therefore of the dependability of the capacitor can be achieved.

What is claimed is:

1. An electronic trip device comprising:

an electronic processing circuit for performing protection functions and comprising means for comparing, in a circuit to be protected, a measured current with a preset threshold that is lower than at least one tripping threshold;

a power supply circuit comprising a power supply capacitor having a plurality of terminals and means for regulating voltage at said terminals according to a preset voltage;

current measuring means connected to said electronic processing circuit, and to said power supply circuit; and means for setting a reference voltage of the regulating means to a first preset value during a preset period comprising a power-on state of the trip device or when the measured current is equal to or greater than the preset threshold, and to a second preset value lower than the first preset value, after said preset period.

2. The trip device according to claim 1, further comprising a trip coil, wherein the second preset value of the reference voltage is lover than a voltage necessary to activate the trip coil.

3. The trip device according to claim 1, wherein the processing circuit comprises an output terminal and the regulating circuit comprises an input terminal connected to the output terminal of the electronic processing circuit.

4. The trip device according to claim 1, wherein the preset period comprises between 10 milliseconds and 100 milliseconds.

5. The trip device according claim 1, wherein the power supply circuit comprises a switching power supply.

* * * * *